(12) United States Patent
Iyer et al.

(10) Patent No.: US 10,343,639 B2
(45) Date of Patent: Jul. 9, 2019

(54) SYSTEMS AND METHODS FOR ROTATING A ROOF MOUNTED AIRBAG BASED ON SEAT ROTATION

(71) Applicant: GM GLOBAL TECHNOLOGY OPERATIONS LLC, Detroit, MI (US)

(72) Inventors: Anand V. Iyer, Bangalore (IN); Rami Z. Sayed, Farmington Hills, MI (US); Bruce L. Stone, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 93 days.

(21) Appl. No.: 15/710,189

(22) Filed: Sep. 20, 2017

(65) Prior Publication Data

US 2019/0084517 A1   Mar. 21, 2019

(51) Int. Cl.
| | | |
|---|---|---|
| *B60R 21/214* | (2011.01) | |
| *B60R 21/232* | (2011.01) | |
| *B60N 2/14* | (2006.01) | |
| *B60R 21/00* | (2006.01) | |

(52) U.S. Cl.
CPC ............ *B60R 21/214* (2013.01); *B60N 2/143* (2013.01); *B60R 21/232* (2013.01); *B60R 2021/0004* (2013.01)

(58) Field of Classification Search
CPC .... B60R 2021/0273; B60N 2/14; B60N 2/143
See application file for complete search history.

(56) References Cited

U.S. PATENT DOCUMENTS

| | | | |
|---|---|---|---|
| 9,744,932 B1* | 8/2017 | Faruque | ................... B60R 21/16 |
| 9,789,840 B2* | 10/2017 | Farooq | ................... B60R 21/231 |
| 2003/0195685 A1* | 10/2003 | Mori | ...................... B60R 21/203 |
| | | | 701/45 |
| 2015/0166185 A1* | 6/2015 | Oleson | ............... B64D 11/0619 |
| | | | 297/216.1 |
| 2017/0088078 A1* | 3/2017 | Nagasawa | ............. B60R 21/013 |

\* cited by examiner

*Primary Examiner* — James A English

(57) ABSTRACT

A seat of a vehicle is mounted to a first rotatable plate that is mounted to a floor of the vehicle within a passenger compartment of the vehicle. An airbag module: includes an airbag and a deployment device that deploys the airbag; and is mounted to a second rotatable plate mounted to a roof of the vehicle above the seat. An electric motor is configured to rotate the second rotatable plate. A restraint control module is configured to, based on a rotational position of the first rotatable plate, apply power to the electric motor and rotate the second rotatable plate.

20 Claims, 8 Drawing Sheets

SYSTEMS AND METHODS FOR ROTATING A ROOF MOUNTED AIRBAG BASED ON SEAT ROTATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to occupant restraint devices and more particularly systems and methods for rotating roof mounted airbags based on rotation of an associated seat of a vehicle.

Various occupant restraint devices are available in vehicles. For example, vehicles include seat belts that restrain movement of vehicle occupants during an impact event. Seat belts are located at each designated seating position and may be designed to accommodate a large range of occupant sizes.

Another type of occupant restraint device is a system of one or more airbags. For example, an airbag may be implemented within a steering wheel of the vehicle. Upon detection of a frontal collision, the airbag within the steering wheel may be deployed in an effort to manage the energy of the driver of the vehicle due to the crash forces.

SUMMARY

In a feature, a rotation control system of a vehicle is described. A seat is mounted to a first rotatable plate mounted to a floor of the vehicle within a passenger compartment of the vehicle. An airbag module: includes an airbag and a deployment device that deploys the airbag; and is mounted to a second rotatable plate mounted to a roof of the vehicle above the seat. An electric motor is configured to rotate the second rotatable plate. A restraint control module is configured to, based on a rotational position of the first rotatable plate, apply power to the electric motor and rotate the second rotatable plate.

In further features, the restraint control module is configured to apply power to the electric motor and rotate the second rotatable plate based on: the rotational position of the first rotatable plate; and a rotational position of the second rotatable plate.

In further features: a first position sensor measures the rotational position of the first rotatable plate; and a second position sensor measures the rotational position of the second rotatable plate.

In further features, the restraint control module is configured to apply power to the electric motor and rotate the second rotatable plate based on adjusting the rotational position of the second rotatable plate to the rotatable position of the first rotatable plate.

In further features, the first rotatable plate is configured to rotate the seat such that the seat faces: a forward direction of travel of the vehicle at a first time; and a backward direction of travel of the vehicle at a second time that is different than the first time.

In further features, the first rotatable plate is further configured to rotate the seat such that the seat faces at least one position between the forward direction of travel of the vehicle and the backward direction of travel of the vehicle.

In further features: the first rotatable plate is configured to rotate about a first axis of rotation; the second rotatable plate is configured to rotate about a second axis of rotation; and the first axis of rotation and the second axis of rotation are coaxial.

In further features: a second electric motor is configured to rotate the first rotatable plate; and a seat control module is configured to, based on user input indicative of a request to rotate the seat, apply power to the second electric motor and rotate the first rotatable plate.

In further features, a deployable reaction surface is mounted to the second rotatable plate.

In further features, the deployable reaction surface is mounted to the second rotatable plate radially outwardly from the airbag module.

In further features, the deployable reaction surface is configured to extend away from the roof of the vehicle in response to being triggered.

In further features, the airbag module, the electric motor, and the second rotatable plate are located between the roof of the vehicle and interior roof trim of the vehicle.

In further features, the airbag module further includes a backing member that is fixed to a portion of the airbag and that is configured to contact the deployable reaction surface upon deployment of the airbag.

In further features, the restraint control module is further configured to, in response to the occurrence of an event, trigger deployment of the deployable reaction surface and deployment of the airbag.

In further features, the restraint control module is configured to trigger deployment of the deployable reaction surface before triggering deployment of the airbag.

In a feature, a rotation control method for a vehicle includes: by a first electric motor, selectively rotating a seat that is mounted to a first rotatable plate that is mounted to a floor of the vehicle within a passenger compartment of the vehicle; by a deployment device, selectively deploying an airbag mounted to a second rotatable plate that is mounted to a roof of the vehicle above the seat; by a second electric motor, selectively rotating the second rotatable plate; and, based on a rotational position of the first rotatable plate, applying power to the electric motor and rotating the second rotatable plate.

In further features, applying power to the second electric motor and rotating the second rotatable plate includes applying power to the second electric motor and rotating the second rotatable plate based on: the rotational position of the first rotatable plate; and a second rotational position of the second rotatable plate.

In further features, applying power to the second electric motor and rotating the second rotatable plate includes applying power to the second electric motor and rotating the second rotatable plate based on adjusting the second rotational position of the second rotatable plate to the rotatable position of the first rotatable plate.

In further features, the first rotatable plate is configured to rotate the seat such that the seat faces: a forward direction of travel of the vehicle at a first time; and a backward direction of travel of the vehicle at a second time that is different than the first time.

In further features, the rotation control method further includes selectively deploying a deployable reaction surface that is mounted to the second rotatable plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles may include one or more different types of airbag systems and other types of occupant restraint devices. One type of airbag system includes a roof mounted airbag system. In a roof mounted airbag system, an airbag is mounted to a roof panel of the vehicle between the roof panel and interior roof trim. The roof mounted airbag may be deployed to manage the energy of a vehicle occupant, for example, in the event of an impact event.

When deployed, the roof mounted airbag occupies a predetermined space. For example, the predetermined space may be in front of the seating location of the vehicle occupant relative to the normal forward direction of travel of the vehicle.

Some vehicles, however, such as autonomous vehicles may include rotatable occupant seats. For example, a front seat of the vehicle may be rotatable such that the front seat can be positioned facing the forward direction of travel of the vehicle and facing the backward direction of travel of the vehicle. The front seat may also be positioned facing one or more sideways directions between the forward direction of travel and the backward direction of travel of the vehicle.

According to the present disclosure, a control module rotates a roof mounted airbag system associated with a rotatable seat of the vehicle based on a position of the rotatable seat. In this manner, the control module rotates the roof mounted airbag system such that the roof mounted airbag will be deployed in front of an occupant of the rotatable seat.

Figure 1:
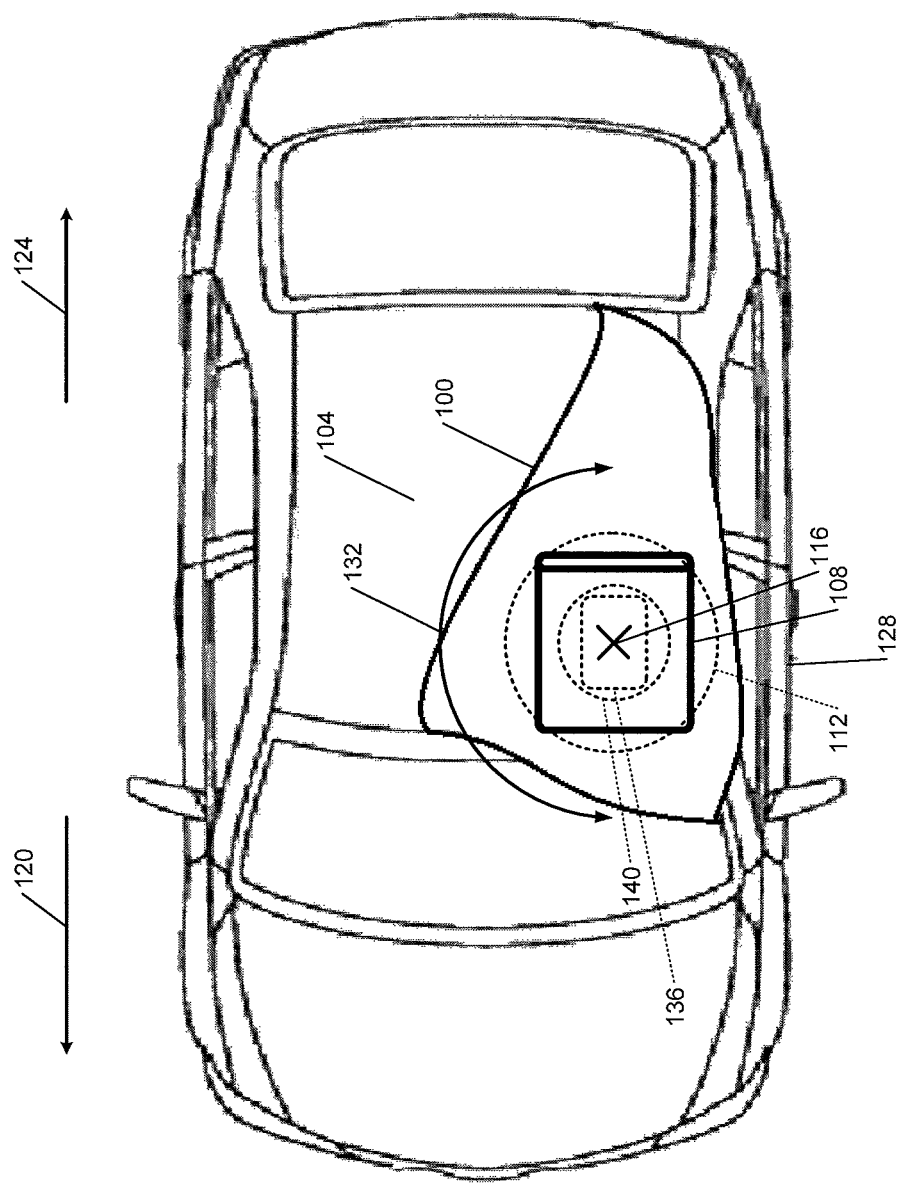
FIG. 1 is a top view of an example vehicle including a rotatable seat and a roof mounted airbag system.

FIG. 1 includes a top view of an example vehicle including an example cutaway portion 100. The vehicle includes a roof 104 over a passenger compartment of the vehicle. A rotatable seat 108 is located within the passenger compartment of the vehicle.

The rotatable seat 108 is mounted to a rotatable plate 112 and rotates about an axis 116. The rotatable seat 108 may be rotatable 360 degrees or rotation of the rotatable seat 108 may be limited to less than 360 degrees. For example, rotation of the rotatable seat 108 may be limited to 180 degrees between a forward direction 120 of travel of the vehicle and a backward direction 124 of travel of the vehicle, and the 180 degrees may be away from a door 128 of the vehicle that is associated with the rotatable seat 108. An example of rotation of the rotatable seat 108 is illustrated by 132. The rotatable seat 108 can be positioned at the forward direction 120 and the backward direction 124. The rotatable seat 108 can also be positioned in at least position that is rotationally between the forward direction 120 and the backward direction 124.

In various implementations, the rotatable seat 108 may be fixed and not moveable in the forward and backward directions 120 and 124 of travel of the vehicle. The rotatable seat 108 may also be fixed and not moveable in directions perpendicular to the forward and backward directions 120 and 124 of travel. In other words, the rotatable seat 108 may only be rotatable and may not be moveable forwards, backwards, or sideways. Incline and decline of a base of the rotatable seat 108, however, may be adjustable. Recline of a back of the rotatable seat 108 may also be adjustable.

A roof mounted airbag system is mounted to the inside of the roof 104 above the rotatable seat 108 and is associated with the rotatable seat 108. While the example of one rotatable seat and one roof mounted airbag system is described in detail herein, the vehicle may include two or more rotatable seats and one roof mounted airbag system may be provided for each rotatable seat.

The roof mounted airbag system includes an airbag module 136 and a rotatable plate 140. The airbag module 136 is mounted to the rotatable plate 140 and rotates about the axis 116. As discussed further below, a control module rotates the roof mounted airbag system based on rotation of the rotatable seat 108.

Figure 2:
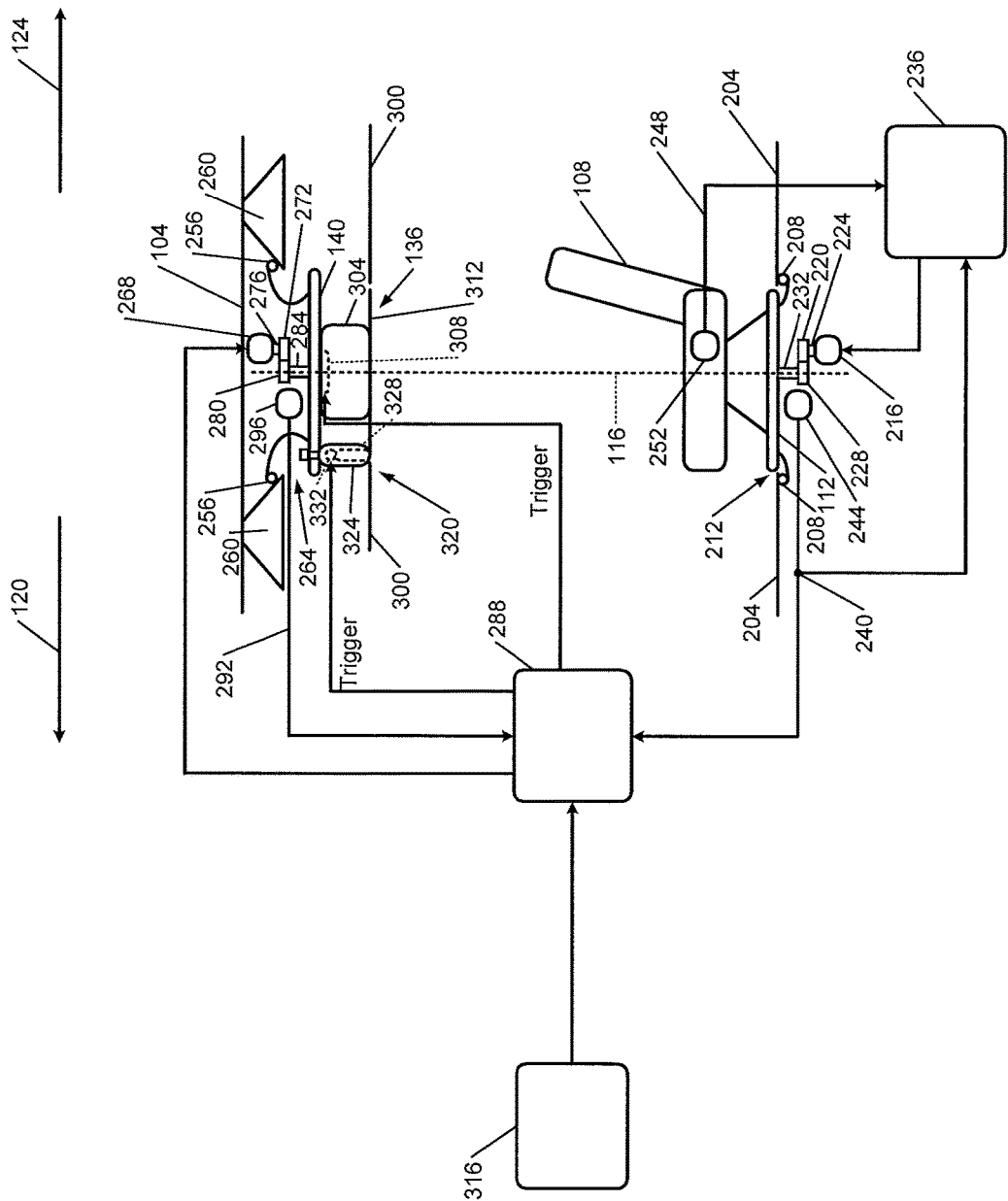
FIGS. 2 and 3 include functional block diagrams including example side views of the rotatable seat and the roof mounted airbag system pre-deployment.
Figure 3:
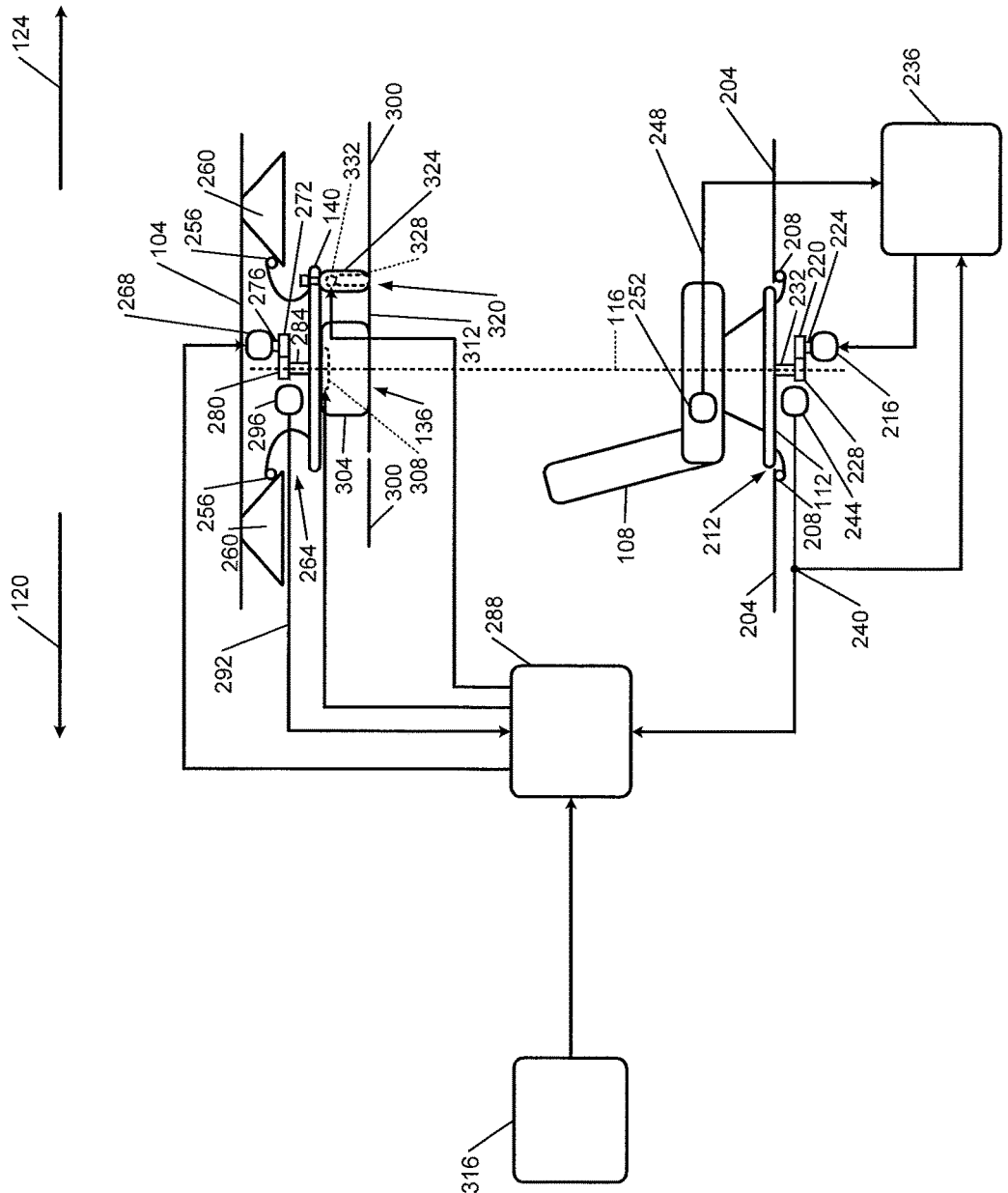

FIGS. 2 and 3 include functional block diagrams including example side views of the rotatable seat 108 and the roof mounted airbag system. In FIG. 2, the rotatable seat 108 is illustrated facing the forward direction 120 of travel of the vehicle. In FIG. 3, the rotatable seat 108 is illustrated facing the backward direction 120 of travel of the vehicle.

Referring now to FIGS. 2 and 3, the rotatable seat 108 is mounted to the rotatable plate 112, and the rotatable plate 112 is secured to a floor 204 of the vehicle. The rotatable plate 112 may be secured to the floor 204 and rotate via one or more rollers 208, such as one or bearings, that engage an underside of the floor 204 and that roll around a periphery of an opening 212 for the rotatable plate 112 in the floor 204.

An electric motor 216 drives rotation of the rotatable plate 112 and, therefore, the rotatable seat 108. For example, a first toothed wheel 220 may be coupled to an output shaft 224 of the electric motor 216, and a second toothed wheel 228 may be coupled to a shaft 232 that is coupled to the rotatable plate 112. While this example is provided, the electric motor 216 may drive the rotatable plate 112 using another type of drivetrain. The electric motor 216 may be a servomotor or another suitable type of motor.

The electric motor 216 drives rotation of the rotatable plate 112 when power is applied to the electric motor 216. A seat control module 236 selectively applies power to the electric motor 216 to adjust a seat position 240 of the rotatable seat 108 to a target position. The seat control module 236 may apply power to the electric motor 216, for example, from one or more batteries of the vehicle.

A seat position sensor 244 measures the seat position 240. The seat position 240 refers to the rotational position of the rotatable plate 112. For example only, the seat position sensor 244 may be a Hall effect sensor, a variable reluctance sensor, or another suitable type of position sensor. The seat position sensor 244 may determine the seat position 240, for example, based on teeth of the toothed wheel 228 passing the seat position sensor 244. The seat position 240 may be expressed as an angle, for example, with respect to the forward direction 120 of travel of the vehicle where 0 degrees corresponds to the forward direction 120 and positive angles are expressed relative to the forward direction 120.

The seat control module 236 sets the target position of the rotatable seat 108 based on user input 248 indicative of requests to adjust the seat position 240. For example, the seat control module 236 may increase the target position (e.g., by a predetermined angle every predetermined period) in response to receipt of a first user input (e.g., actuation of a user input device in a first direction or user input to a first user input device) indicative of a request to rotate the rotatable seat 108 in one direction (e.g., away from the forward direction 120). The seat control module 236 may limit the target position to, at most, a predetermined maximum value (e.g., 180 degrees). The seat control module 236 may decrease the target position toward or to zero (e.g., by the predetermined angle every predetermined period) in response to receipt of a second user input (e.g., actuation of the user input device in a second direction or user input to a second user input device) indicative of a request to rotate the rotatable seat 108 in the other direction (e.g., toward the forward direction 120). The seat control module 236 may limit the target position to, at a minimum, zero.

One or more user input devices 252 generates the user input 248 based on user input (e.g., actuation, touching) to the one or more user input devices 252. While the one or user input devices 252 are illustrated as being implemented on the rotatable seat 108, the one or more user input devices 252 may be implemented in one or more other locations. Also, while the example of automatic control of the rotation of the rotatable seat 108 is provided, the rotatable seat 108 may be manually rotatable in various implementations. In the example of the rotatable seat 108 being manually rotatable, the seat control module 236 and the electric motor 216 may be omitted. One or more other components may also be omitted.

The rotatable seat 108 and the rotatable plate 112 rotate about the axis 116. The airbag module 136 and the rotatable plate 140 also rotate about the axis 116. In other words, the axis of rotation of the rotatable seat 108 and the rotatable plate 112 and the axis of rotation of the airbag module 136 and the rotatable plate 140 are coaxial. In various implementations, the rotatable seat 108 and the airbag module 136 may have axes of rotation that are coaxial and that are different than the rotational axes of the rotatable plate 112 and/or the rotatable plate 140.

The airbag module 136 is mounted to the rotatable plate 140, and the rotatable plate 140 is secured to the roof 104 of the vehicle. For example, the rotatable plate 140 may rotate via one or more rollers 256, such as one or bearings, that engage one or more structural members 260 (e.g., roof rails) on an underside of the roof 104 and that roll around a periphery of an opening 264.

An electric motor 268 drives rotation of the rotatable plate 140 and, therefore, the airbag module 136. For example, a first toothed wheel 272 may be coupled to an output shaft 276 of the electric motor 268, and a second toothed wheel 280 may be coupled to a shaft 284 that is coupled to the rotatable plate 140. While this example is provided, the electric motor 268 may drive the rotatable plate 140 using another type of drivetrain. The electric motor 268 may be a servomotor or another suitable type of motor.

The electric motor 268 drives rotation of the rotatable plate 140 when power is applied to the electric motor 268. A restraint control module 288 selectively applies power to the electric motor 268 to adjust an airbag position 292 to a target position. The restraint control module 288 may apply power to the electric motor 268, for example, from one or more batteries of the vehicle.

An airbag position sensor 296 measures the airbag position 292. The airbag position 292 refers to the rotational position of the rotatable plate 140. For example only, the airbag position sensor 296 may be a Hall effect sensor, a variable reluctance sensor, or another suitable type of position sensor. The airbag position sensor 296 may determine the airbag position 292, for example, based on teeth of the second toothed wheel 280 passing the airbag position sensor 296. The airbag position 292 may be expressed as an angle, for example, with respect to the forward direction 120 of travel of the vehicle where 0 degrees corresponds to the forward direction 120 and positive angles are expressed relative to the forward direction 120.

The restraint control module 288 sets the target position of the airbag module 136 based on the seat position 240. For example, the restraint control module 288 may set the target position equal to the seat position 240.

In various implementations, the restraint control module 288 may set the target position of the airbag module 136 based on the user input 248 indicative of requests to adjust the seat position 240. For example, the restraint control module 288 may increase the target position (e.g., by the predetermined angle every predetermined period) in response to receipt of the first user input (e.g., actuation of the user input device in the first direction or user input to the first user input device) indicative of the request to rotate the rotatable seat 108 in one direction (e.g., away from the forward direction 120). The restraint control module 288 may limit the target position to, at most, the predetermined maximum value (e.g., 180 degrees). The restraint control module 288 may decrease the target position toward or to zero (e.g., by the predetermined angle every predetermined period) in response to receipt of the second user input (e.g., actuation of the user input device in the second direction or user input to the second user input device) indicative of the request to rotate the rotatable seat 108 in the other direction (e.g., toward the forward direction 120). The restraint control module 288 may limit the target position to, at a minimum, zero.

The airbag module 136 is implemented between the roof 104 of the vehicle and interior roof trim 300. The interior roof trim 300 covers an underside of the roof 104 from view. The airbag module 136 includes an airbag 304 and a deployment device 308. The airbag module 136 may also include a backing member (e.g., plate) 312 that is fixed to a portion of the airbag 304. When the airbag 304 is not inflated, the backing member 312 may occupy an opening in the interior roof trim 300.

Figure 4:
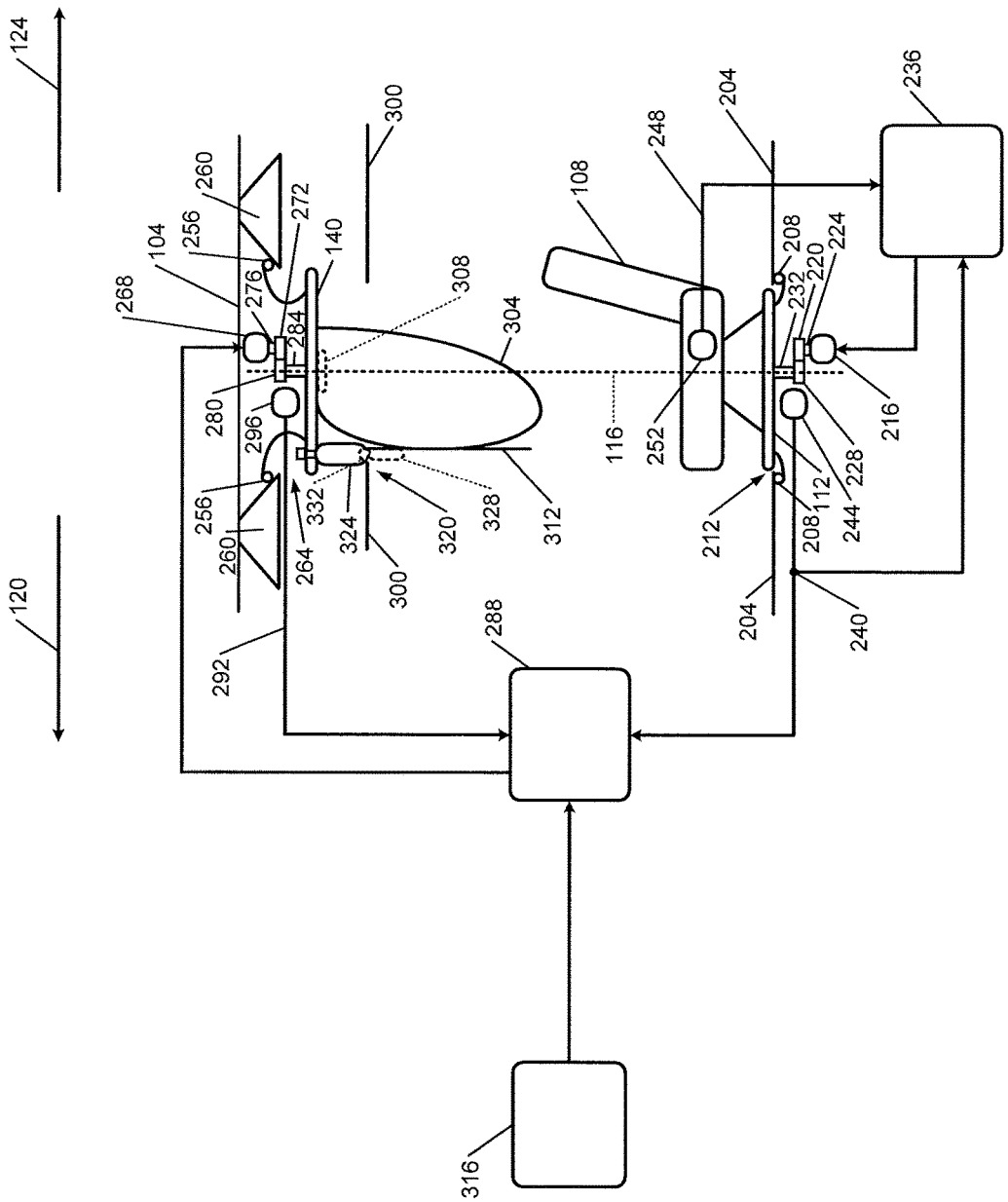
FIGS. 4 and 5 include functional block diagrams including example side views of the rotatable seat and the roof mounted airbag system post-deployment.
Figure 5:
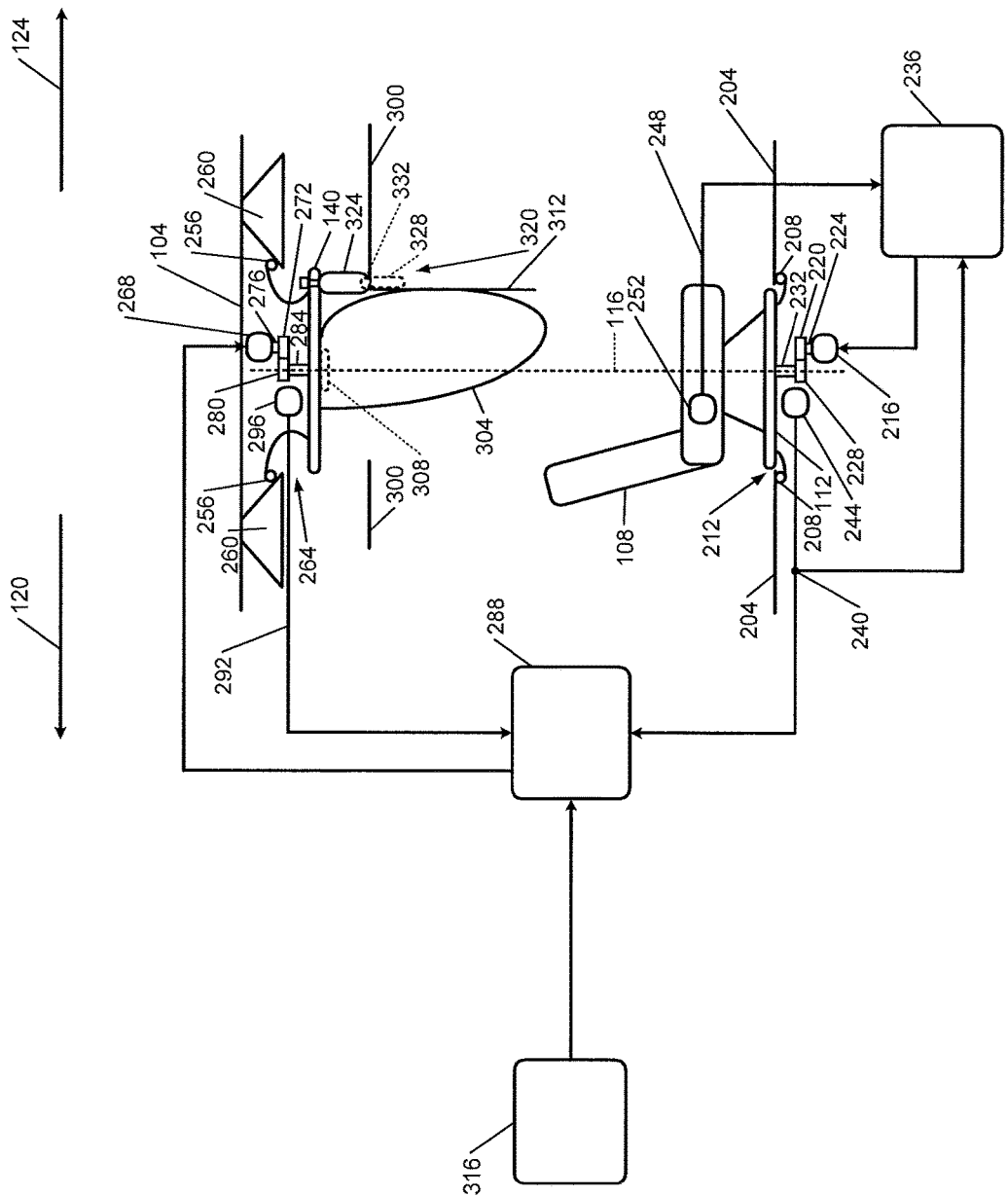

FIGS. 2 and 3 illustrate the airbag 304 stowed/before deployment/inflation. The airbag 304 is configured to deploy away from the roof 104. FIGS. 4 and 5 illustrate the airbag 304 deployed/inflated.

The restraint control module 288 selectively triggers the deployment device 308 to inflate/deploy the airbag 304. The deployment device 308 may include, for example, an igniter and a pyrotechnic device that ignites and fills/inflates the airbag 304 with gas (e.g., air) when triggered. While the example of an igniter and a pyrotechnic device is provided, another suitable type of deployment device may be used.

The restraint control module 288 may trigger the deployment device 308 when one or more conditions are satisfied, such as when an impact event is detected. The restraint control module 288 may detect the occurrence of an impact event, for example, based on signals from one or more sensors 316.

The one or more sensors 316 may include, for example, a yaw rate sensor, a lateral acceleration sensor, a longitudinal acceleration sensor, a vehicle roll velocity sensor, one or more suspension displacement sensors, and/or one or more other types of crash detection sensors. The yaw rate sensor measures a yaw rate of the vehicle. The lateral acceleration sensor measures a lateral acceleration of the vehicle. The longitudinal acceleration sensor measures a longitudinal acceleration of the vehicle. The roll velocity sensor measures a roll velocity (or roll rate) of the vehicle. The suspension displacement sensors measure displacement of one or more suspension components of the vehicle relative to a reference. For example, one or more suspension components of a wheel may extend when the wheel lifts off of the ground, such as during a vehicle rollover event. One or more suspension displacement sensors may be provided for each wheel of the vehicle.

A deployable reaction surface 320 may also be mounted to the rotatable plate 140. The deployable reaction surface 320 may be mounted to the rotatable plate 140 radially outwardly from the airbag module 136. The deployable reaction surface 320 therefore also rotates with the rotatable plate 140. The deployable reaction surface 320 may be mounted to the rotatable plate 140, for example, via one or more bolts or in another suitable manner. The deployable reaction surface 320 may be stowed behind the interior roof trim 300 before deployment. In various implementations, a portion of the deployable reaction surface 320 may extend below the interior roof trim 300, for example, for use as a support handle.

The deployable reaction surface 320 includes a fixed portion 324, a deployable portion 328, and a deployment device 332. The restraint control module 288 selectively triggers the deployment device 332 to deploy (e.g., extend) the deployable portion 328. The deployable reaction surface 320 is configured to extend away from the roof 104 of the vehicle. The deployment device 308 may include, for example, a quick release solenoid that retracts clips and allows a biasing member (e.g., a spring) to deploy the deployable portion 328. While the example of a quick release solenoid is provided, another suitable type of deployment device may be used.

The restraint control module 288 may trigger the deployment device 332 when one or more conditions are satisfied, such as when an impact event is detected. The restraint control module 288 may trigger the deployment device 332, for example, before or simultaneously with triggering the deployment device 308. The backing member 312 may contact the deployable reaction surface 320 during deployment of the airbag 304 to direct the airbag 304 into position. This may prevent the airbag 304 from extending too far in front of an occupant sitting in the rotatable seat 108. The deployable reaction surface 320 also serves as a support/stop for the airbag 304 when the airbag 304 is contacted from within the passenger cabin by an occupant or another object.

In various implementations, the restraint control module 288 may set deployment timing of the deployment device 332 and the airbag 304 based on the seat position 240 and the direction of the impact event. For example, relative to the deployment timing for a frontal or rear impact that occurs while the seat position 240 is in the forward direction 120 or the backward direction 124 of travel of the vehicle, the restraint control module 288 may advance or delay deployment of the deployment device 332 and/or the airbag 304 when a side impact or a rollover impact occurs. Additionally or alternatively, relative to the deployment timing for a frontal or rear impact that occurs while the seat position 240 is in the forward direction 120 or the backward direction 124 of travel of the vehicle, the restraint control module 288 may advance or delay deployment of the deployment device 332 and/or the airbag 304 when the seat position 240 is between the forward and backward directions 120 and 124 of travel of the vehicle.

As stated above, FIGS. 4 and 5 illustrate the airbag 304 deployed/inflated. FIGS. 4 and 5 also illustrate the deployable reaction surface 320 deployed.

Figure 7:
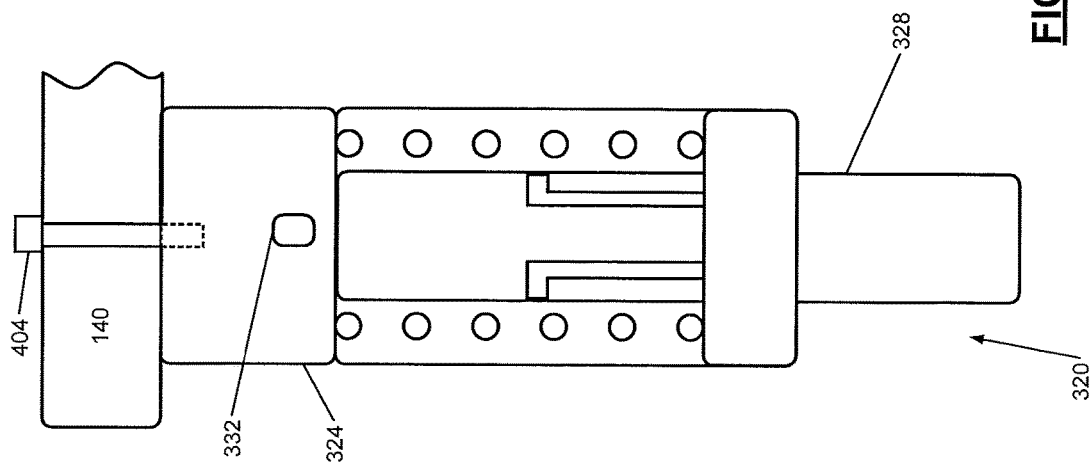
FIGS. 6 and 7 include cross-sectional views of example deployable reaction surfaces pre- and post-deployment.
Figure 6:
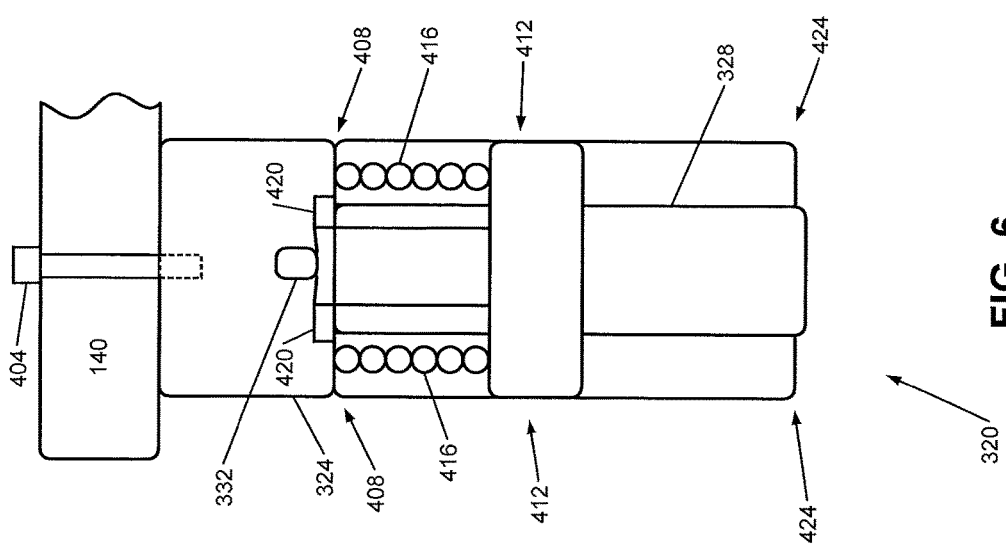

FIGS. 6-7 are cross-sectional views of an example implementation of the deployable reaction surface 320. FIG. 6 illustrates the deployable reaction surface 320 pre-deployment. FIG. 7 illustrates the deployable reaction surface 320 when deployed.

As shown in FIG. 6, the fixed portion 324 is mounted to the rotatable plate 140, for example, via one or more bolts such as bolt 404. The fixed portion 324 may include an upper shoulder member 408 that extends inwardly (e.g., radially inwardly). The deployable portion 328 also includes a shoulder member 412 that extends outwardly and may contact inner walls of the fixed portion 324. A biasing device 416, such as a spring, is disposed between the upper shoulder member 408 and the shoulder member 412.

The deployable portion 328 may include an inner member that includes one or more tabs, such as tabs 420, that are biased outwardly and that clip over the upper shoulder member 408 pre-deployment as shown in FIG. 6. The biasing device 416 is compressed pre-deployment.

The fixed portion 324 may also include a lower shoulder member 424 that extends inwardly (e.g., radially inwardly). When triggered, the deployment device 332 releases the deployable portion 328 from the fixed portion 324 and the biasing device 416 forces the deployable portion 328 away from the pre-deployment position and toward the lower shoulder member 424. For example, the deployment device 332 may pull the tabs 420 inwardly away from the upper shoulder member 408. The biasing device 416 urges the deployable portion 328 such that the bottom surface of the shoulder member 412 of the deployable portion 328 engages the upper shoulder member 408 of the fixed portion 324, as shown in FIG. 7.

Figure 8:
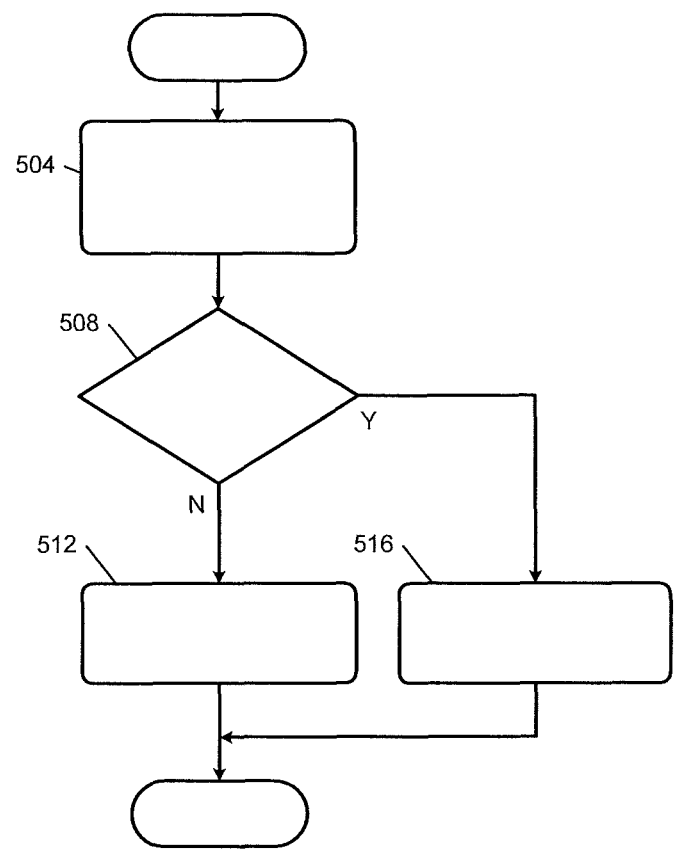
FIG. 8 includes a flowchart depicting an example method of controlling rotation of a roof mounted airbag system based on rotation of a rotatable seat.

FIG. 8 includes a flowchart depicting an example method of rotating the airbag module 136 and the deployable reaction surface 320 based on rotation of the rotatable seat 108. Control may begin with 504 where the restraint control module 288 receives the seat position 240 and the airbag position 292. At 508, the restraint control module 288 may determine whether the airbag position 292 is the same as the seat position 240. If 508 is false, at 512 the restraint control module 288 applies power to the electric motor 268 and rotates the rotatable plate 140 to adjust the airbag position 292 toward or to the seat position 240. Rotation of the rotatable plate 140 rotates the airbag module 136 and the deployable reaction surface 320. If 508 is true, at 516 the restraint control module 288 maintains the position of the rotatable plate 140. By rotating the rotatable plate 140 according to rotation of the rotatable seat 108, the deployable reaction surface 320 and the airbag 304 will be in proper position for deployment. While control is shown as ending, FIG. 8 is illustrative of one control loop and control may return to 504.

Figure 9:
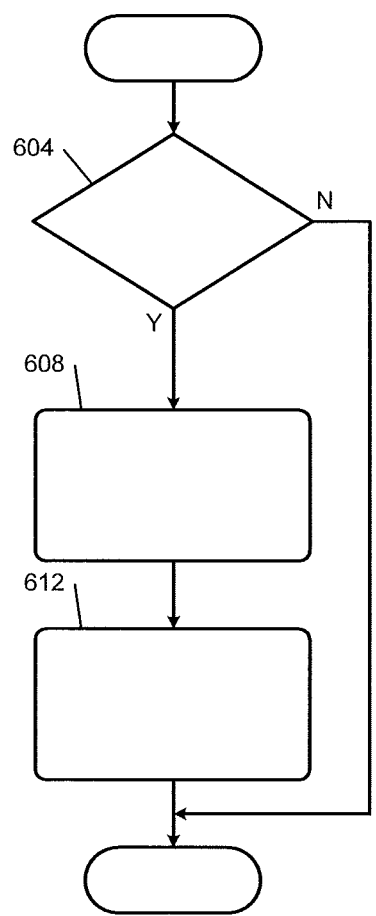
FIG. 9 includes a flowchart depicting an example method of deploying an airbag of a roof mounted airbag system and a deployable reaction surface.

FIG. 9 is a flowchart depicting an example method of deploying the deployable reaction surface 320 and the airbag 304. Control may begin with 604 where the restraint control module 288 determines whether one or more conditions are satisfied for deploying the deployable reaction surface 320 and the airbag 304. For example, the restraint control module 288 may determine whether an impact event is occurring or will occur. If 604 is true, control continues with 608. If 604 is false, control may end.

At 608, the restraint control module 288 triggers deployment of the deployable reaction surface 320. The deployment device 336 deploys (e.g., extends) the deployable portion 328 in response to the trigger. At 612, the restraint control module 288 triggers deployment of the airbag 304. The deployment device 308 deploys (e.g., inflates) the airbag 304 in response to the trigger. While the example of triggering deployment of the deployable reaction surface 320 before the airbag 304 is provided, the restraint control module 288 may trigger deployment of the deployable reaction surface 320 and the airbag 304 concurrently or may trigger the deployment of the deployable reaction surface 320 after triggering deployment of the airbag 304. Also, while control is shown as ending, FIG. 6 is illustrative of one control loop and control may return to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A rotation control system of a vehicle, comprising:
a seat that is mounted to a first rotatable plate mounted to a floor of the vehicle within a passenger compartment of the vehicle;
an airbag module that:
includes an airbag and a deployment device that deploys the airbag; and
is mounted to a second rotatable plate mounted to a roof of the vehicle above the seat;
an electric motor configured to rotate the second rotatable plate; and
a restraint control module configured to, based on a rotational position of the first rotatable plate, apply power to the electric motor and rotate the second rotatable plate.

2. The rotation control system of claim 1 wherein the restraint control module is configured to apply power to the electric motor and rotate the second rotatable plate based on:
the rotational position of the first rotatable plate; and
a rotational position of the second rotatable plate.

3. The rotation control system of claim 2 further comprising:
a first position sensor that measures the rotational position of the first rotatable plate; and
a second position sensor that measures the rotational position of the second rotatable plate.

4. The rotation control system of claim 2 wherein the restraint control module is configured to apply power to the electric motor and rotate the second rotatable plate based on adjusting the rotational position of the second rotatable plate to the rotatable position of the first rotatable plate.

5. The rotation control system of claim 2 further comprising the first rotatable plate, wherein the first rotatable plate is configured to rotate the seat such that the seat faces:
a forward direction of travel of the vehicle at a first time; and
a backward direction of travel of the vehicle at a second time that is different than the first time.

6. The rotation control system of claim 5 wherein the first rotatable plate is further configured to rotate the seat such that the seat faces at least one position between the forward direction of travel of the vehicle and the backward direction of travel of the vehicle.

7. The rotation control system of claim 2 further comprising the first rotatable plate and the second rotatable plate, wherein:
the first rotatable plate is configured to rotate about a first axis of rotation;
the second rotatable plate is configured to rotate about a second axis of rotation; and
the first axis of rotation and the second axis of rotation are coaxial.

8. The rotation control system of claim 2 further comprising:
a second electric motor configured to rotate the first rotatable plate; and
a seat control module configured to, based on user input indicative of a request to rotate the seat, apply power to the second electric motor and rotate the first rotatable plate.

9. The rotation control system of claim 2 further comprising a deployable reaction surface that is mounted to the second rotatable plate.

10. The rotation control system of claim 9 wherein the deployable reaction surface is mounted to the second rotatable plate radially outwardly from the airbag module.

11. The rotation control system of claim 9 wherein the deployable reaction surface is configured to extend away from the roof of the vehicle in response to being triggered.

12. The rotation control system of claim 9 wherein the airbag module, the electric motor, and the second rotatable plate are located between the roof of the vehicle and interior roof trim of the vehicle.

13. The rotation control system of claim 12 wherein the airbag module further includes a backing member that is fixed to a portion of the airbag and that is configured to contact the deployable reaction surface upon deployment of the airbag.

14. The rotation control system of claim 9 wherein the restraint control module is further configured to, in response to the occurrence of an event, trigger deployment of the deployable reaction surface and deployment of the airbag.

15. The rotation control system of claim 14 wherein the restraint control module is configured to trigger deployment of the deployable reaction surface before triggering deployment of the airbag.

16. A rotation control method for a vehicle, comprising:
by a first electric motor, selectively rotating a seat that is mounted to a first rotatable plate that is mounted to a floor of the vehicle within a passenger compartment of the vehicle;
by a deployment device, selectively deploying an airbag mounted to a second rotatable plate that is mounted to a roof of the vehicle above the seat;
by a second electric motor, selectively rotating the second rotatable plate; and based on a rotational position of the first rotatable plate,
applying power to the second electric motor and rotating the second rotatable plate.

17. The rotation control method of claim 16 wherein applying power to the second electric motor and rotating the second rotatable plate includes applying power to the second electric motor and rotating the second rotatable plate based on:
   the rotational position of the first rotatable plate; and
   a second rotational position of the second rotatable plate.

18. The rotation control method of claim 17 wherein applying power to the second electric motor and rotating the second rotatable plate includes applying power to the second electric motor and rotating the second rotatable plate based on adjusting the second rotational position of the second rotatable plate to the rotatable position of the first rotatable plate.

19. The rotation control method of claim 17 wherein the first rotatable plate is configured to rotate the seat such that the seat faces:
   a forward direction of travel of the vehicle at a first time; and
   a backward direction of travel of the vehicle at a second time that is different than the first time.

20. The rotation control method of claim 16 further comprising selectively deploying a deployable reaction surface that is mounted to the second rotatable plate.

* * * * *